Jan. 24, 1961  F. C. RAYMALEY  2,969,456
CHRISTMAS TREE LIGHTING DEVICE
Filed Feb. 28, 1958  2 Sheets-Sheet 1

INVENTOR.
FLORENCE C. RAYMALEY,
BY
McMorrow Berman + Davidson
ATTORNEYS.

Jan. 24, 1961 F. C. RAYMALEY 2,969,456
CHRISTMAS TREE LIGHTING DEVICE
Filed Feb. 28, 1958 2 Sheets-Sheet 2
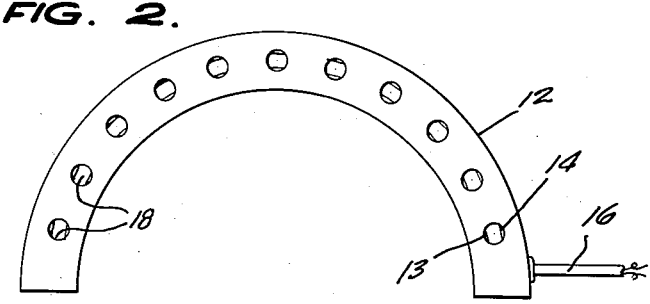
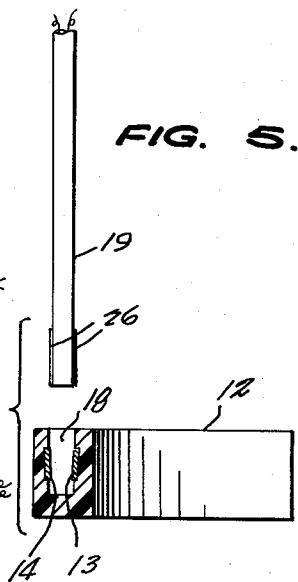
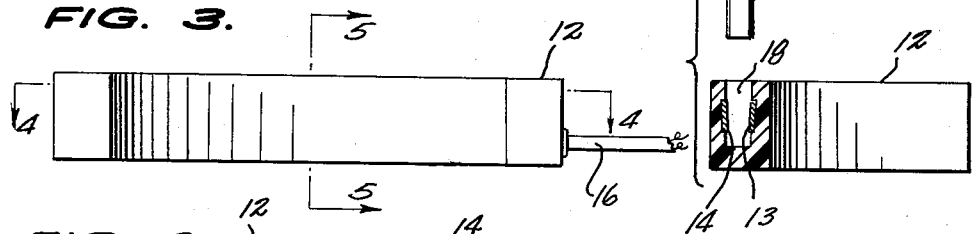
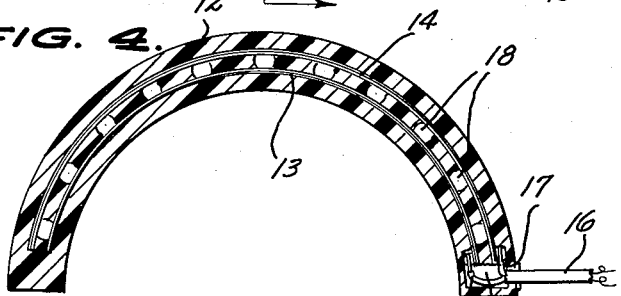
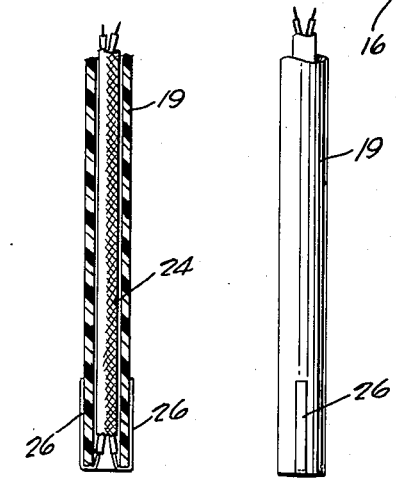
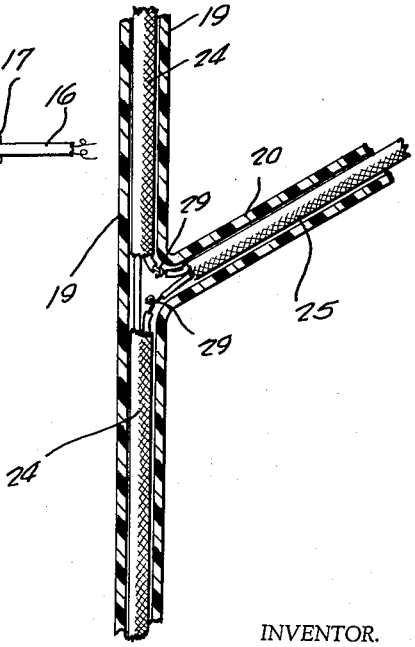
INVENTOR.
FLORENCE C. RAYMALEY,
BY
McMorrow, Berman & Davidson
ATTORNEYS.

United States Patent Office 2,969,456
Patented Jan. 24, 1961

2,969,456

CHRISTMAS TREE LIGHTING DEVICE

Florence C. Raymaley, 62 Reservoir Ave.,
Jersey City, N.J.

Filed Feb. 28, 1958, Ser. No. 718,232

1 Claim. (Cl. 240—10)

This invention relates to illumination devices, and more particularly to a device employed to illuminate a Christmas tree.

A main object of the invention is to provide a novel and improved Christmas tree lighting device which is simple in construction, which is easy to install, and which is effective to illuminate a Christmas tree without requiring the branches of the tree to be loaded and to sag due to the weight of the wires and bulbs required.

A further object of the invention is to provide an improved Christmas tree lighting device which is inexpensive to manufacture, which is durable in construction, and which does not interfere with the normal configuration of the tree with which it is employed, allowing the tree to stand erect in a substantially natural condition without causing the branches of the tree to be deformed.

Further objects and advantages of the invention will become apparent from the following description and claim, and from the accompanying drawings, wherein:

Figure 2 is an enlarged top plan view of one of the arcuate base members employed in Figure 1.

Figure 3 is an elevational view of the base member of Figure 2.

Figure 4 is a horizontal cross sectional view taken on the line 4—4 of Figure 3.

Figure 5 is a transverse vertical cross sectional view taken on the line 5—5 of Figure 3, and showing the lower portion of a stem member in a position to be engaged in one of the sockets of the base member.

Figure 6 is an enlarged vertical cross sectional view taken through the lower portion of a stem member forming part of a Christmas tree lighting device according to the present invention.

Figure 7 is an elevational view of the lower portion of the stem member shown in Figure 6.

Figure 8 is a vertical cross sectional view taken through a stem member employed in a Christmas tree lighting device according to the present invention, and showing the junction between the stem member and one of the tubular branches carried by said stem member.

Figure 1:
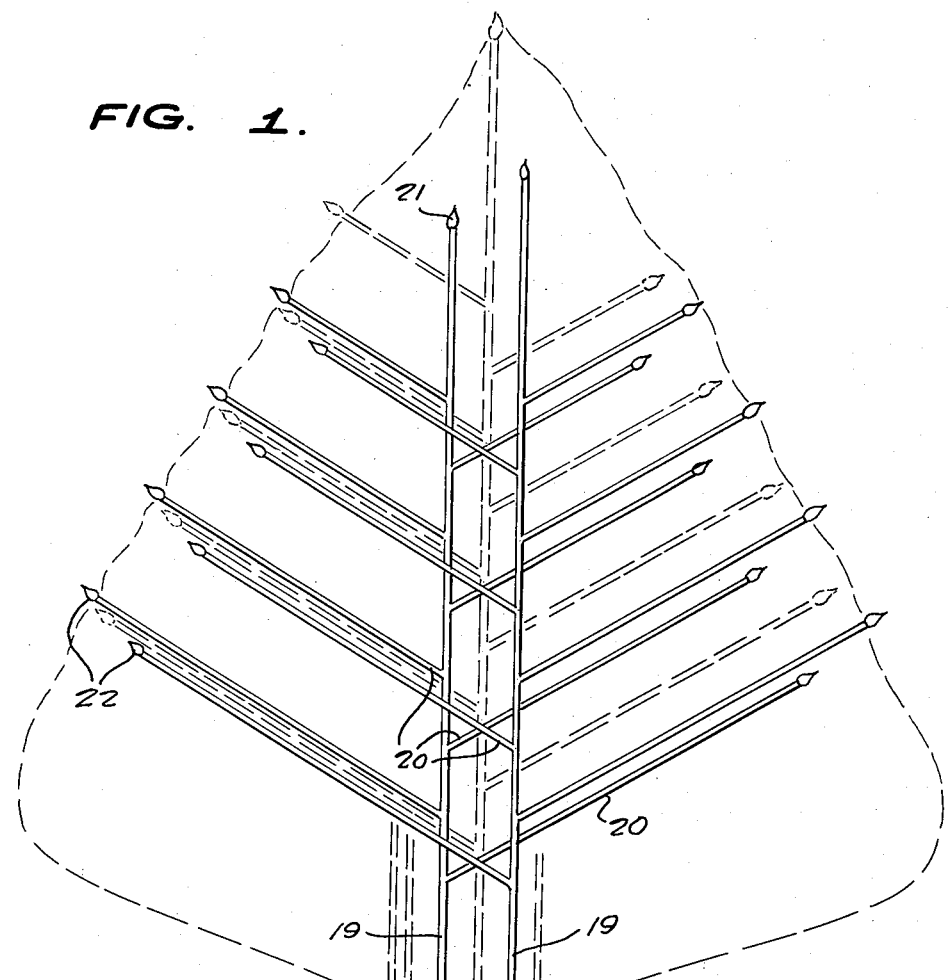
Figure 1 is a perspective view of Christmas tree lighting devices constructed in accordance with the present invention, shown set up for use with a Christmas tree whose outline is shown in dotted view.
Figure 9:
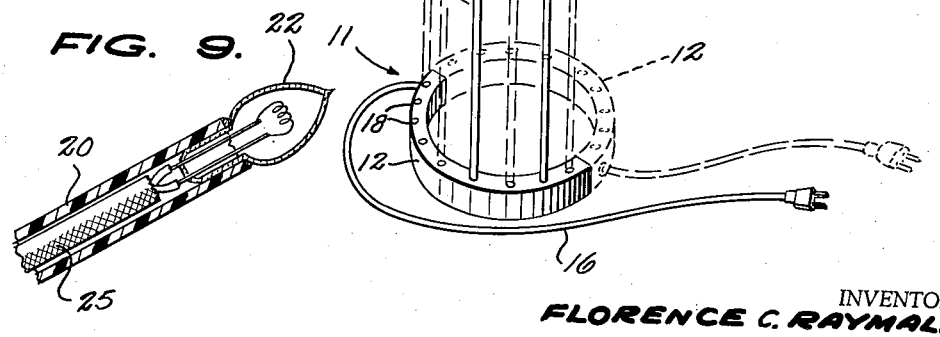
Figure 9 is an enlarged vertical cross sectional view taken longitudinally through the outer end portion of one of the tubular branch members and showing a lamp member therein.

Referring to the drawings, 11 generally designates a Christmas tree lighting device according to the present invention. The lighting device comprises a generally arcuate solid rigid base member 12 which is preferably semicircular in shape, as shown, and which has embedded therein a pair of arcuate contact strips 13 and 14 arranged in spaced parallel relationship and extending substantially for the entire length of the base member. As shown in Figure 4, the contact strips 13 and 14 are substantially concentric with the base member and terminate at a cavity 15 formed in one end portion of the base member. A line cord 16 extends through the outside wall of the base member into the cavity 15 and comprises conductors 16 and 17 which are respectively connected to the ends of the contact strips 13 and 14.

The arcuate base member 12 is formed with the evenly spaced vertical bores 18 opening at the top thereof and extending below and between the contact strips 13 and 14, as is clearly shown in Figure 5. Thus, the vertical bores 18 define sockets opening at the top surface of the arcuate base member 12 and provided with respective opposing contact elements comprising the opposing contact strips 13 and 14.

The vertical bores 18 are adapted to receive the lower end portions of vertical tubular stem members 19, each stem member having a plurality of vertically spaced tubular branches 20 communicatively connected thereto along its length, the stem members and branches being of flexible material having a substantial degree of rigidity, such as of plastic tubing, or of any other suitable insulating tubing having a substantial degree of rigidity.

As shown in Figure 8, each branch 20 is smoothly joined to the associated stem member 19 and is inclined upwardly and outwardly therefrom, so as to be easily receivable among the branches of a Christmas tree and so as to generally conform to the inclination of the branches of the tree.

Secured in the top end of each vertical stem member 19 is a Christmas tree lamp bulb 21 and secured in the end of each of the branches 20 is a similar Christmas tree lamp bulb 22.

As shown in Figure 1, the branches 20 progressively are reduced in length upwardly along their associated vertical stem member 19, generally in accordance with the reduction in length of the branches of a Christmas tree upwardly along the trunk of the tree.

The vertical stem members 19 contain respective sections of double-conductor cable 24 and the branches 20 similarly contain sections of double-conductor cable 25. The sections of cable 24 and 25 are electrically connected together at the junctions between the branches 20 and the vertical stem member 19 in the manner illustrated in Figure 8 so that the conductors in the branches are connected in series with each other and with the conductors in the vertical stem 19 associated therewith to define a series circuit wherein the lamp 21 at the top end of the stem member and the lamps 22 at the ends of the tubular branches are connected in series. The lower ends of the conductors in the lowermost cable section 24 in each vertical stem member 19 are electrically connected to respective external contact strips 26, 26 secured in diametrically opposing relationship on the lower end of the vertical stem member, as shown in Figure 6, the contact strips 26, 26 being adapted to transversely engage with the contact strips 13 and 14 of the base member 12 when the stem member is engaged in one of the sockets 18.

Obviously, the vertical stem member 19 may contain a single double-conductor cable one of whose conductors is opened at the junction of each branch 20 with the vertical stem member and which is spliced to the respective conductors of the cable sections 25 in the branches, in the manner illustrated in Figure 8. Thus, the series circuit may be formed in any conventional manner, and it will be further understood that any suitable insulating means may be employed to insulate the splices 29, 29 at the junctions of the branches 20 to the stem member 19.

Any desired number of stem members and associated branches 20 may be employed with the base member 12, the stem members being inserted in selected sockets 18, whereby their circuits are electrically connected to the contact strips 13 and 14 of the base member so as to be energized therefrom. As shown in dotted view in Figure 1, two opposing semicircular base members 12 may be employed to surround the trunk of the Christmas tree, and a desired number of vertical stem members 19 may be employed with each base member. The branches 20 of the stem members are suitably disposed among the branches of the Christmas tree so that the lamps 22 at the ends of the branches 20 will be visible at the outer portion of the tree and will be suitably distributed over the tree.

While a specific embodiment of an improved Christmas tree lighting device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A Christmas tree lighting device comprising a substantially straight tubular vertical stem member having a plurality of upwardly and outwardly inclined tubular branches of progressively diminishing length upwardly along the stem member communicatively connected thereto at spaced locations along its length, said stem member and branches being of relatively rigid material, respective lamps mounted on the ends of the stem member and branches, spaced diametrically opposed external vertical, upwardly extending contact strips mounted longitudinally on the lower end of said stem member, conductors disposed in said stem member and branches and connecting said lamps in a series circuit, the ends of said conductors being respectively connected to said diametrically opposed external contact strips, a generally semicircular horizontal base member of solid rigid insulating material, opposing spaced arcuate conductors embedded horizontally in said base member concentrically therewith and extending substantially for its entire length, and a line cord connected to the ends of said arcuate conductors, said base member being formed with a plurality of substantially cylindrical vertical bores spaced therealong and opening at the top surface of said base member with their axes located midway between said arcuate conductors, said bores being of sufficient diameter to expose portions of said conductors, each bore being adapted to supportingly receive the lower end of said stem member in a position wherein said contact strips transversely engage the respective exposed portions of said arcuate conductors.

References Cited in the file of this patent

UNITED STATES PATENTS

| | | |
|---|---|---|
| 1,656,148 | Harris | Jan. 10, 1928 |
| 2,064,199 | Elder | Dec. 15, 1936 |
| 2,219,568 | Stewart | Oct. 29, 1940 |
| 2,465,419 | Barany | Mar. 29, 1949 |